July 27, 1954 P. E. VOLZ 2,685,033

BEAM DEFLECTION CONTROL FOR CATHODE-RAY DEVICES

Filed Jan. 2, 1951

INVENTOR
Philip E. Volz
BY
George T. Craig
ATTORNEY

Patented July 27, 1954 2,685,033

UNITED STATES PATENT OFFICE 2,685,033

BEAM DEFLECTION CONTROL FOR CATHODE-RAY DEVICES

Philip E. Volz, Florham Park, N. J., assignor to Radio Corporation of America, a corporation of Delaware Application January 2, 1951, Serial No. 203,820

5 Claims. (Cl. 250—36)

The present invention relates to means for controlling deflection of a cathode ray beam, and, more particularly, but not necessarily exclusively, to novel means for controlling the scanning deflection with respect to synchronism and phase in cathode ray beam apparatus, such, for example, as a cathode raye tube, automatically in accordance with a received or derived signal.

In accordance with the invention, in one preferred form the novel means referred to include a signal repeating device, such, for example, as a vacuum tube which accepts keying pulses and received or derived pulses. The signal repeating device operates class C and its output circuit includes a resonant circuit or tank circuit. The tank circuit voltage controls a generator of deflection waves. The latter are available to drive a deflection amplifier. Impulse noise not coincident with the keying pulses has no effect on the control function in apparatus operating in accordance with the invention. Thermal noise effect is greatly reduced by the tank circuit. The frequency and phase of production of the deflection wave is such that a desired phase relationship is maintained between a series of controlling signals such, for example, as television sync signals and the deflection wave output.

The invention, as pointed out above, is especially suitable for synchronizing the sweep frequency of cathode ray tube apparatus and particularly for the synchronization of a television receiver. The setting chosen as the illustrative embodiment of the invention shows its application to control the horizontal synchronization of a television receiver; but by a choice of component values, the invention may be used for vertical synchronization of a television receiver, or for any other remote synchronizing system where the synchronizing information is transmitted with the intelligence signal.

The principal object of the present invention is to provide novel apparatus for controlling the operation of a deflection voltage generator in accordance with a series of control signals.

Another object is to provide novel means for keying a signal repeating device.

A further object is to provide a novel system for controlling the repetition rate of a signal generator including a discharge tube.

A still further object is to provide in a novel manner for controlling the operation of a class C amplifier by the application of gating pulses.

Other objects and advantages of the invention will, of course, become apparent and immediately suggest themselves to those skilled in the art to which this invention is directed from a reading of the following specification in connection with the accompanying drawing in which.

Figures 1, 2, 3:
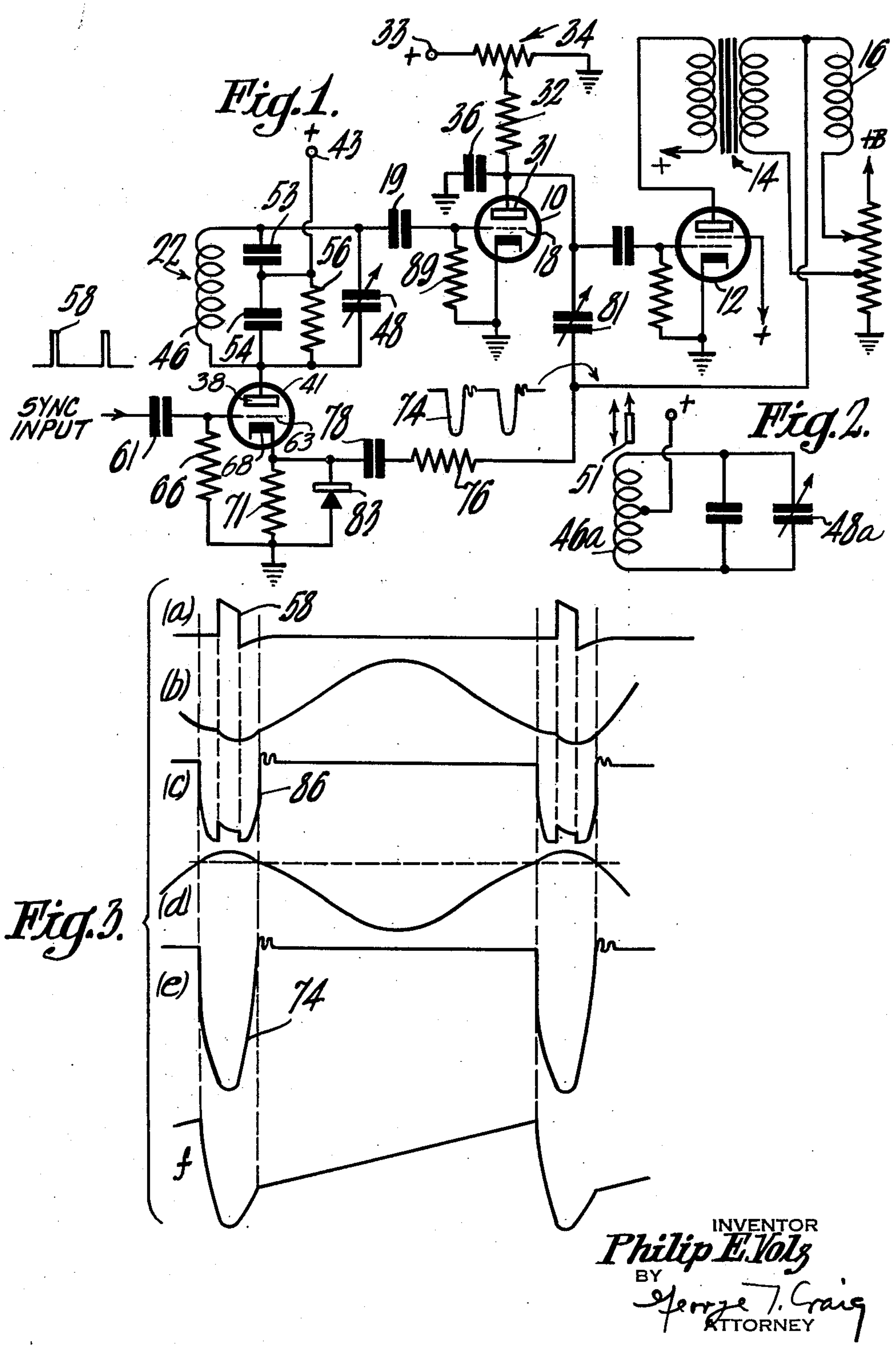
Fig. 1 shows, diagrammatically, a portion of a television receiver embodying the present invention.
Fig. 2 shows a slight modification of the apparatus of Fig. 1.
Fig. 3 shows a series of related curves illustrating operation of the apparatus of Fig. 1 in accordance with this invention.

Referring to the drawing, there is shown by way of example, a deflection circuit for deflecting the cathode ray beam of a cathode ray tube (not shown) in one direction, for example, the horizontal direction. Another similar deflection circuit (not shown) may be employed to produce deflection in another direction substantially at right angles to the first direction thereby to produce a scanned raster in a well-known manner. Known deflection wave form generating circuits employing a discharge tube and being very generally similar to that shown herein by way of example, are disclosed in a U. S. Patent No. 2,101,520, granted December 7, 1937, to W. A. Tolson and Patent No. 2,482,737, granted September 20, 1949, to H. R. Shaw.

The deflection circuit selected by way of example as a setting for the present invention, although the invention is not limited in use to circuits of this type, comprises a discharge tube 10, a power tube 12, a deflection transformer 14, and deflection coils 16. The coils 16 may be incorporated in a deflection yoke for use with a cathode ray tube (neither shown). It will be understood that a damper tube (not shown) is usually provided for a purpose which is by now well known and may, for example, be of the type disclosed in U. S. Patent No. 2,309,672, granted February 2, 1943, to Otto H. Schade, which shows a damper tube in the plate circuit of the scanning output tube. Suitable centering means (not shown), such as are well known in the art, may be incorporated as desired in the circuit which supplies deflection current to the coils 16. Inasmuch as the power tube 12 and the parts so far described are more or less conventional, they need not be described further herein.

The grid 18 of the discharge tube 10 is connected through suitable coupling means, shown as a condenser 19 to an oscillatory circuit 22 to be described more in detail. The anode 31 of the discharge tube 10 is connected through a charging resistor 32 to a suitable adjustable source of positive voltage (not shown) as indicated schematically at 33. A potentiometer 34 provides for voltage adjustment. The voltage supply source may be the usual "B+" or anode supply source generally associated with electronic equipment. A condenser 36 is charged in series with the resistor 32 from the connection 33 when the tube 10 is substantially cut off. A sawtooth of voltage will appear across the condenser 36 since it is discharged periodically as described hereinafter.

The anode 38 of a tube 41 is connected to one side of the previously mentioned oscillatory or tank circuit 22. The connection from the anode 38 through the tank circuit 22 is returned to the previously mentioned source of positive potential (not shown) as indicated schematically by the terminal 43. In the arrangement of Fig. 1, the tank circuit includes an inductance 46 and an adjustable condenser 48 connected in parallel. It will be understood by those skilled in the art that the inductance 46 may be adjustable, adjustment being effected by a moving core 51 (Fig. 2). The tank circuit 22 is tapped to obtain phase inversion and as shown in Fig. 1. Capacitors 53 and 54 are employed to obtain the tap for connection to the terminal 43. A resistor 56 is used to supply direct current to the anode 38 of the tube 41. Fig. 2 illustrates an alternative tank circuit where the inductor 46*a* is tapped and no resistor is needed. In Figs. 1 and 2, condenser 48 or 48*a* serves to tune the tank circuit and act as a hold control. Alternatively, in Fig. 1 or Fig. 2 a core or slug such as the core 51 shown in Fig. 2 may be used as a trimmer and hold control.

Received or derived control signals such as sync signal pulses 58 are applied by way of a coupling condenser 61 to the grid 63 of the tube 41. This grid is returned to a reference point in the system such as ground by way of a grid resistor 66. The cathode 68 of the tube is returned to the same reference point, ground, for example, by way of a cathode resistor 71.

A series of voltage pulses 74 of negative polarity are produced; one during each beam retrace or flyback interval in the secondary of the transformer 14. These pulses are employed in accordance with the invention as keying pulses for the tube 41. Pulses which are positive-going with respect to a voltage reference point appearing in the system may be obtained from the primary of the transformer 14 and these are usable if their polarity is changed. These pulses 74 are applied through a series combination of a resistor 76 and a condenser 78 to the cathode 68 of the tube 41. The trailing edge of the sawtooth appearing across or derived with the aid of the condenser 36 is sharpened by applying the pulses 74 to one terminal of the condenser 36 by way of an adjustable condenser 81.

Having described on illustrative embodiment of the invention, the manner in which it operates will now be set forth in detail. The negative pulse 74, which also appears in Fig. 3*e*, developed across the deflection coils 16 during retrace serves as the keying pulse. This pulse is attenuated, shaped and coupled to the cathode 68 by the network 71, 76, 78 and a rectifying device 83. The rectifying device or diode 83 clips the negative peak of the pulse from the yoke producing a rectangular keying pulse 86 (Fig. 3*c*) at the cathode 68. The illustrative arrangement of Fig. 1 will operate without the diode 83 in which case the keying pulse in the cathode is simply the attenuated yoke pulse. However, the pull in characteristic is better with a rectangular keying pulse. The amplitude of the keying at the cathode of the tube 41 is sufficient to block this tube except during retrace. The incoming sync pulses 58 (Fig. 3*a*) are applied to the grid 63 through condenser 61 and the resistor 66 as stated above. The sync pulses in Fig. 3*a* are shown as occurring during the local retrace interval. These conditions obtain after the circuit has pulled-in to synchronism. If the sync pulse amplitude is small, plate current will flow in the tube 41 during the entire local keying pulse, but the current amplitude will be greater during the sync pulse. If the sync pulse amplitude is large, plate current will flow in the tube 41 only during the sync pulse. Therefore, by adjustment of the sync amplitude, the desired degree of hold-in may be obtained. With small sync amplitude, the hold-in range is less but the reduction of jitter in the sync pulse edges is greater. With the larger sync amplitude, the hold-in range is greater but reduction in jitter of the sync pulse edges is less. Hold-in range means the allowable range of tank circuit frequency.

The plate current pulses in the tube 41 generate a tank circuit voltage. The voltage at the plate end of the tank circuit is shown in Fig. 3*b*. The voltage at the other end of the tank circuit has the opposite phase and is shown in Fig. 3*d*. The tuning of the tank circuit controls the interval between the local pulses and must be within limits for pull-in to occur. Within these limits, tuning of the tank circuit regulates the position of the sync pulse within the keying pulse and hence the position of the image on the raster. Since hold-in is maintained as long as the sync pulse occurs during the local keying pulse, the hold control 48 serves the further useful purpose of allowing the picture to be moved relative to the raster until proper framing of the picture in the mask or receiver viewing aperture is obtained.

The tank circuit voltage (Fig. 3*d*) is coupled to the grid 18 of the tube 10 through the previously mentioned condenser 19 and a grid resistor 89. This voltage is much larger than the cut-off voltage of the tube 10. This voltage together with the grid leak bias supplied by grid current in the tube 10 causes this tube to be blocked except for short parts of each cycle. During the time when the tube 10 is blocked, the condenser 36 is charging through the resistor 32 and the potentiometer 34. When the tube 10 starts to conduct, the condenser 36 starts to discharge through the tube. The negative voltage which is thus produced at the plate of the tube 10 is coupled to the deflection amplifier and the beginning of the yoke pulse is generated. As stated above, this yoke pulse is coupled back to the plate of the tube 10 through the condenser 81, which serves as the peaking control. The circuit is operable without this peaking; but the retrace time is shortened and the fly-back voltage is increased by the use of this feedback. The composite wave consisting of the sawtooth plus the peaking which is generated at the plate of the tube 10 is shown in Fig. 3*f*. The plate supply voltage for the tube 10 is controlled by the setting of the potentiometer 34. This controls the sawtooth amplitude and hence the picture size. It is within the scope of the invention to maintain the supply voltage at a fixed value and the condenser 36 may be made variable to control the picture size.

The reduction of sync jitter due to thermal noise is highly effective and is due to the following: (*a*) the random phase jitter in tank circuit voltage is smaller than the random phase jitter in pulses supplied by the tube 10; (*b*) by using the proper sync amplitude, some of the pulse current in the tube 10 is due to tank circuit voltage and some is due to sync input, thus reducing the effective pulse current jitter. The effects of impulse noise are greatly reduced since impulse noise occurring outside the local keying pulse has no effect on the tank circuit.

What is claimed is:

1. A phase control system for electrical apparatus comprising an oscillatory circuit, a phase comparison device comprising a tube having a cathode, an anode, and a control electrode, said oscillatory circuit being included in the anode circuit of said tube, means for deriving pulses in step with said electrical apparatus, means to apply said pulses to said cathode, means to apply controlling pulses to said control electrode, means for driving said electrical apparatus comprising a tube serving as a sawtooth wave generator, a condenser, a resistor through which said condenser is charged, means whereby said second named tube serves to discharge said condenser, and coupling means for coupling said oscillatory circuit to said second named tube for initiating operation of said driving means.

2. A phase control system for electrical apparatus comprising an oscillatory circuit, a phase comparison device comprising a tube having a cathode, an anode, and a control electrode, said oscillatory circuit being included in the anode circuit of said tube, means for deriving pulses in step with said electrical apparatus, means to apply said derived pulses to said cathode, means to apply controlling pulses to said control electrode, means for driving said electrical apparatus comprising a tube serving as a sawtooth wave generator, a condenser, a resistor through which said condenser is charged, means whereby said second named tube serves to discharge said condenser, means to apply said derived pulses to said condenser, and coupling means for coupling said oscillatory circuit to said second named tube for initiating operation of said driving means.

3. A phase control system for electrical apparatus comprising a tunable oscillatory circuit, said oscillatory circuit comprising an inductance shunted by two condensers connected in series and a resistor shunting one of said condensers, a phase comparison device comprising a tube having a cathode, an anode, and a control electrode, a connection from one end of said resistor in said oscillatory circuit to the anode of said tube, a connection to the other end of said resistor to a positive direct current voltage source, means for deriving pulses in step with said electrical apparatus, means to apply said pulses to said cathode, means to apply controlling pulses to said control electrode, means for driving electrical apparatus comprising a tube serving as a sawtooth wave generator, a condenser, a resistor through which said condenser is charged, means whereby said second named tube serves to discharge said condenser, and coupling means for coupling said oscillatory circuit to said second named tube for initiating operation of said driving means.

4. A phase control system for electrical apparatus comprising a tunable oscillatory circuit, said oscillatory circuit comprising an inductance shunted by a condenser, a phase comparison device comprising a tube having a cathode, an anode, and a control electrode, a connection from a tap on said inductance to a positive direct current voltage source, said oscillatory circuit being included in the anode circuit of said tube, means for deriving pulses in step with said electrical apparatus, means to apply said pulses to said cathode, means to apply controlling pulses to said control electrode, means for driving electrical apparatus comprising a tube serving as a sawtooth wave generator, a condenser, a resistor through which said condenser is charged, means whereby said second named tube serves to discharge said condenser, and coupling means for coupling said oscillatory circuit to said second named tube for initiating operation of said driving means.

5. A phase control system for electrical apparatus comprising a tube having a cathode, an anode, and a control electrode, said cathode being connected to a voltage reference point through a cathode resistor, a unilaterally conducting device connected from said cathode to said voltage reference point, means including a coupling condenser for supplying sync pulses to said grid, a grid resistor connected from said control electrode to said voltage reference point, an oscillatory circuit connected to said anode, a connection from said oscillatory circuit to a source of positive direct current voltage, means to feed pulses derived in step with the operation of said electrical apparatus to said cathode, and means for applying the output of said oscillatory circuit to control operation of said electrical apparatus.

References Cited in the file of this patent

UNITED STATES PATENTS

| Number | Name | Date |
|---|---|---|
| 2,440,786 | Schade | May 4, 1948 |
| 2,466,784 | Schade | Apr. 12, 1949 |
| 2,492,090 | Bass | Dec. 20, 1949 |
| 2,510,027 | Torsch | May 30, 1950 |
| 2,543,305 | Schwarz | Feb. 27, 1951 |
| 2,545,346 | Edelsohn | Mar. 13, 1951 |
| 2,559,512 | Morgan | July 3, 1951 |
| 2,561,817 | Parker | July 24, 1951 |